United States Patent
Choo

(10) Patent No.: US 9,821,735 B2
(45) Date of Patent: Nov. 21, 2017

(54) SYSTEM AND METHOD FOR CONNECTING EXTERNAL DEVICE WITH VEHICLE

(71) Applicant: Hyundai Motor Company, Seoul (KR)

(72) Inventor: Sung Kwan Choo, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 4 days.

(21) Appl. No.: 14/941,806

(22) Filed: Nov. 16, 2015

(65) Prior Publication Data

US 2017/0001582 A1    Jan. 5, 2017

(30) Foreign Application Priority Data

Jul. 2, 2015 (KR) .................. 10-2015-0094519

(51) Int. Cl.
| | | |
|---|---|---|
| *B60R 16/03* | (2006.01) | |
| *H02H 3/08* | (2006.01) | |
| *B60K 35/00* | (2006.01) | |
| *B60R 16/00* | (2006.01) | |

(52) U.S. Cl.
CPC .............. *B60R 16/03* (2013.01); *B60K 35/00* (2013.01); *B60R 16/00* (2013.01); *H02H 3/08* (2013.01)

(58) Field of Classification Search
CPC .......... B60R 16/00; B60R 16/03; H02H 3/08; B60K 35/00
See application file for complete search history.

(56) References Cited

U.S. PATENT DOCUMENTS

| | | | | | |
|---|---|---|---|---|---|
| 5,569,997 | A | * | 10/1996 | Berger | .................... H02J 9/061 307/66 |
| 6,166,909 | A | * | 12/2000 | Sumida | ............... B60R 16/0238 165/80.3 |
| 6,465,993 | B1 | * | 10/2002 | Clarkin | ................. H02M 3/156 323/272 |
| 8,488,289 | B2 | * | 7/2013 | Thiery | ............... H03K 17/0822 361/93.7 |
| 9,403,412 | B2 | * | 8/2016 | Kim | ......................... B60D 1/24 |
| 9,431,843 | B2 | * | 8/2016 | Heo | ....................... H02J 7/0055 |
| 9,610,844 | B2 | * | 4/2017 | Cho | ......................... B60L 1/006 |

(Continued)

FOREIGN PATENT DOCUMENTS

| | | |
|---|---|---|
| JP | 2006-103566 A | 4/2006 |
| JP | 2011-020522 A | 2/2011 |

(Continued)

*Primary Examiner* — Rami Khatib
*Assistant Examiner* — Jeffrey C Boomer
(74) *Attorney, Agent, or Firm* — Mintz Levin Cohn Ferris Glovsky and Popeo, P.C.; Peter F. Corless

(57) ABSTRACT

A system for connecting an external device to a vehicle includes: an external device connection terminal configured to be connected to an external device; an electronic instrument cluster configured to pop-up a user setting mode and provide a kind of power, a cutting time, or rated capacity using the user setting mode; a controller configured to receive power selected by a user from the electronic instrument cluster and control a switching element to protect the external device, the switching element being configured to adjust whether or not power is applied from a battery of the vehicle based on a type of power in the vehicle; and an intelligent power switch (IPS) element configured to sense a current supplied to the external device connection terminal.

4 Claims, 6 Drawing Sheets

(56) References Cited

U.S. PATENT DOCUMENTS

| | | | | |
|---|---|---|---|---|
| 2005/0253458 A1* | 11/2005 | Omae | ................... | H01M 6/36 |
| | | | | 307/10.1 |
| 2008/0074820 A1* | 3/2008 | Thiery | ............... | H03K 17/0822 |
| | | | | 361/93.7 |
| 2012/0262106 A1* | 10/2012 | Omiya | ................... | B60R 16/03 |
| | | | | 320/104 |
| 2013/0002143 A1* | 1/2013 | Panaccio | ............ | H05B 33/0851 |
| | | | | 315/152 |
| 2013/0063850 A1* | 3/2013 | Kawamoto | .............. | H02H 3/08 |
| | | | | 361/87 |
| 2013/0293201 A1* | 11/2013 | Ono | ...................... | B60L 11/123 |
| | | | | 320/138 |
| 2014/0009977 A1* | 1/2014 | Huang | ............... | H02M 3/33507 |
| | | | | 363/21.16 |
| 2014/0285940 A1* | 9/2014 | Greither | ................. | H02H 3/087 |
| | | | | 361/115 |
| 2014/0307351 A1* | 10/2014 | Zhang | ..................... | H02H 7/20 |
| | | | | 361/18 |
| 2015/0108830 A1* | 4/2015 | Gaynier | ................... | G06F 1/26 |
| | | | | 307/9.1 |
| 2017/0063146 A1* | 3/2017 | Ceravalo | ................ | B60R 16/03 |

FOREIGN PATENT DOCUMENTS

| | | | |
|---|---|---|---|
| KR | 10-2007-0059678 | A | 6/2007 |
| KR | 20-0439478 | Y1 | 4/2008 |
| KR | 10-2010-0128381 | A | 12/2010 |
| KR | 10-2011-0055776 | A | 5/2011 |
| KR | 10-2013-0081570 | A | 7/2013 |
| KR | 10-2013-0096471 | A | 8/2013 |
| KR | 10-1372215 | B1 | 3/2014 |
| KR | 10-2014-0119299 | A | 10/2014 |
| KR | 10-1451709 | B1 | 10/2014 |

* cited by examiner

SYSTEM AND METHOD FOR CONNECTING EXTERNAL DEVICE WITH VEHICLE

CROSS-REFERENCE TO RELATED APPLICATION

This application claims the benefit of and priority to Korean Patent Application No. 10-2015-0094519, filed on Jul. 2, 2015 in the Korean Intellectual Property Office, the disclosure of which is incorporated herein in its entirety by reference.

TECHNICAL FIELD

The present disclosure relates generally to a system and method for connecting an external device with a vehicle, and more particularly, to a technology for connecting an external device with a vehicle capable of automatically setting a type of power source and fuse capacity.

BACKGROUND

In general, a vehicle is installed with various peripheral apparatuses such as a black box, navigation device, a terminal charger, and the like. Such devices can be supplied with power from a battery mounted in the vehicle, e.g., through a cigar jack of the vehicle.

However, in a case in which a peripheral apparatus is used through a cigar jack of a vehicle, there is an inconvenience in that the peripheral apparatus may not be continuously used once the vehicle has stopped. The reason is that when peripheral apparatuses are continuously used after the vehicle has stopped, the battery can be fully discharged, which renders the vehicle unstartable.

As an example, a black box for a vehicle, which has been widely used recently, needs to be continuously operated for a predetermined time even after the vehicle has stopped. Since vehicular damage may occur while the vehicle is parked, it is preferable to continuously use the block box, even in a state in which the vehicle has stopped, in order to confirm the damage on the vehicle.

Generally, motorists can spend a lot of money when purchasing a black box in order to generate evidence at the time of an accident. However, since an actual use time of the black box is typically only two hours for commutes, the remaining 22 hours of the day are unusable for the black box. Therefore, even though a motorist wants to use the black box after the vehicle is stopped, the motorist may choose to not utilize the black box under the apprehension that the battery will be discharged.

In addition, when using peripheral apparatuses through the cigar jack of a vehicle, there can be an inconvenience that a cut occurs whenever turning off the ignition of the vehicle. That is, a navigation device, which is widely used among the peripheral apparatuses, suffers from an inconvenience in that when the ignition is turned off, power is cut for a moment simultaneously with the turning off the ignition and is then booted. For example, when the ignition is turned off and is again started for fuel, the navigation device is also turned off in the meanwhile and is again booted. In such case, until the navigation device normally receives GPS information and performs a guide, inconvenience that a significant booting time is delayed occurs.

SUMMARY

The present disclosure has been made to solve the above-mentioned problems occurring in the related art while advantages achieved by the related art are maintained intact.

An aspect of the present disclosure provides a system and method for connecting an external device with a vehicle capable of preventing arbitrary power cut of the external device and supplying stable power to the external device by providing a separate external device connection terminal capable of connecting the external device with the vehicle and selecting, by a user, regular power, ACC power, or ignition power through a user setting of an electronic instrument cluster.

According to embodiments of the present disclosure, a system for connecting an external device with a vehicle includes: an external device connection terminal configured to be connected to an external device; an electronic instrument cluster configured to pop-up a user setting mode and provide the user setting mode; a controller configured to receive power selected by a user from the electronic instrument cluster and control a switching element to protect the external device, the switching element being configured to adjust whether or not power is applied from a battery of the vehicle based on a type of power in the vehicle; and an intelligent power switch (IPS) element configured to sense a current supplied to the external device connection terminal and provide the sensed current to the controller.

The user setting mode may include an external device connection menu, the external device connection menu may include a menu with user-selectable options including the type of power, a cut time setting, and a rated capacity setting.

The type of power may include battery power, ACC power, and ignition power.

The system may further include a key switch configured to adjust the type of power in the vehicle.

Furthermore, according to embodiments of the present disclosure, a method for connecting an external device with a vehicle includes: receiving a selection from a user via an external device connection menu of a user setting mode of an electronic instrument cluster indicating a type of power; providing, by the electronic instrument cluster, the selected type of power to a controller; controlling, by the controller, a switching element according to the selected type of power; providing battery power to an external device connection terminal through an intelligent power switch (IPS) element when the switching element is turned on; measuring, by the IPS element, a current provided to the external device connection terminal; providing, by the IPS element, the measured current to the controller; determining, by the controller, whether or not the measured current is an overcurrent; cutting, by the controller, a current supply to the external device connection terminal when the measured current is the overcurrent; and maintaining, by the controller, the current supply to the external device connection terminal when the measured current is not the overcurrent.

The method may further include determining, by the controller, a position of a key switch.

The method may further include determining, by the controller, the position of the key switch when the selected type of power is ACC power or ignition power.

The method may further include setting a power supply cut time when the selected type of power is battery power.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in detail with reference to the accompanying drawings.

Figure 1:
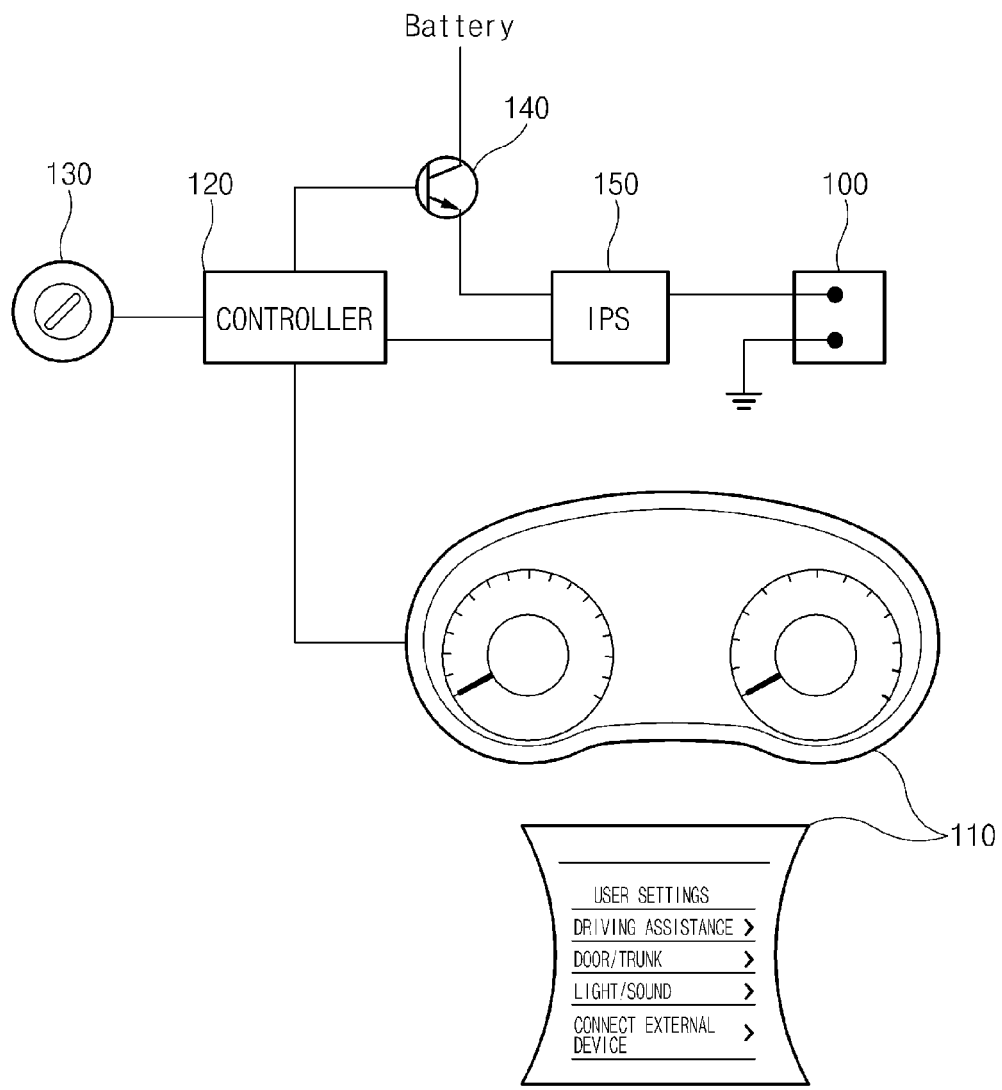
FIG. 1 is a configuration diagram illustrating a system for connecting an external device with a vehicle according to embodiments of the present disclosure.

FIG. 1 is a configuration diagram illustrating a system for connecting an external device with a vehicle according to embodiments of the present disclosure.

As shown in FIG. 1, a system for connecting an external device with a vehicle includes an external device connection terminal 100, an electronic instrument cluster 110, a controller 120, a key switch 130, a switching element 140, and an intelligent power switch (IPS) element 150.

The external device connection terminal 100 is terminal which may be connected to an external device such as a black box, a highpass, or the like, is a terminal that the external device may be connected to a console of the vehicle, or the like. When the switching element 140 is turned on, power supplied from a battery is supplied to the external device connection terminal 100 through the IPS element 150.

The electronic instrument cluster 110 may pop-up a user setting mode, and may be provided to a user or a driver so as to select a kind of power, a cut time, rated capacity, or the like using the user setting mode. Here, the kind of power includes battery power capable of supplying regular power, and an ACC power and ignition power supplying power by changing a position of the key switch.

The controller 120 can be referred to as a microcomputer or a micom, and is connected to the electronic instrument cluster 110, the key switch 130, the switching element 140, and the IPS element 150. Further, the controller 120 may receive the power selected by the user from the electronic instrument cluster and may receive a condition of the key switch 130. The controller 120 may control on or off the switching element 140 depending on the received power condition and the condition of the key switch 130. Further, the controller 120 receives a current sensed by the IPS element 150 and automatically calculates an average value of the sensed current. After a predetermined time, when a current over the average value flows, the controller 120 may turn off the switching element 140 to protect the external device and the external device connection terminal 100.

Using the key switch 130, the user may select the type of power as the battery power, or select the type of power from the ACC power or the ignition power. When the external device is connected to the battery power without using the key switch 130, a discharge of the battery may rapidly occur.

The switching element 140, which is an element adjusting whether or not power is applied from the battery, is turned on or off by an application condition of power of the controller 120, such that power corresponding to the power condition selected by the user is provided or is not provided to the external device connection terminal 100 through the IPS element 150.

The IPS element 150, which is a semiconductor element capable of replacing a fuse, senses the current supplied to the external device connection terminal 100 and transmits the sensed current to the controller 120. Specifically, the IPS element 150 measures an amount of current provided to the external device connection terminal 100 and then transmits the measured amount of current to the controller 120.

Figure 2:
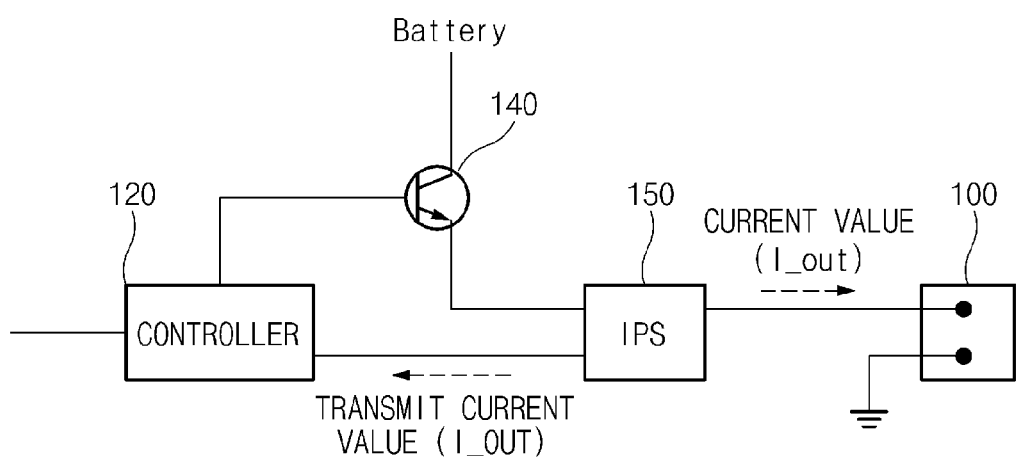
FIG. 2 is a diagram specifically illustrating operation of an intelligent power switch (IPS) element, a controller, and an external device connection terminal in the system for connecting the external device with the vehicle according to embodiments of the present disclosure.

FIG. 2 is a diagram specifically illustrating operation of an IPS element, a controller, and an external device connection terminal in the system for connecting the external device with the vehicle according to embodiments of the present disclosure.

As shown in FIG. 2, the external device connection terminal 100, which is a terminal capable of connecting the external device to the console of the vehicle, or the like, is supplied with a current (I_out) through the IPS element 150 from the battery.

In addition, the IPS element 150 measures a current provided to the external device connection terminal 100 and then transmits the measured current (I_out) to the controller 120. Furthermore, the controller 120 receives a current sensed by the IPS element 150 and automatically calculates an average value of the sensed current. If it is determined that the amount of current flowing in the external device is an overcurrent (i.e., it is determined that it is an overcurrent cut condition), the controller 120 may turn off the switching element 140 to protect a circuit in the system of the vehicle and the external device. The controller 120 calculates a cut current (I_cut) depending on the overcurrent cut condition as follows.

First, a first overcurrent cut condition may be denoted by cut current (I_cut)≥measured current×2, and a second overcurrent cut condition may be denoted by cut current (I_cut) ≥allowable current of external device connection terminal. When the sensed amount of current by the IPS element 150 is equal to or more than the first overcurrent cut condition and the second overcurrent cut condition, the controller 120 may cut the power supplied to the external device connection terminal 100.

Figure 3:
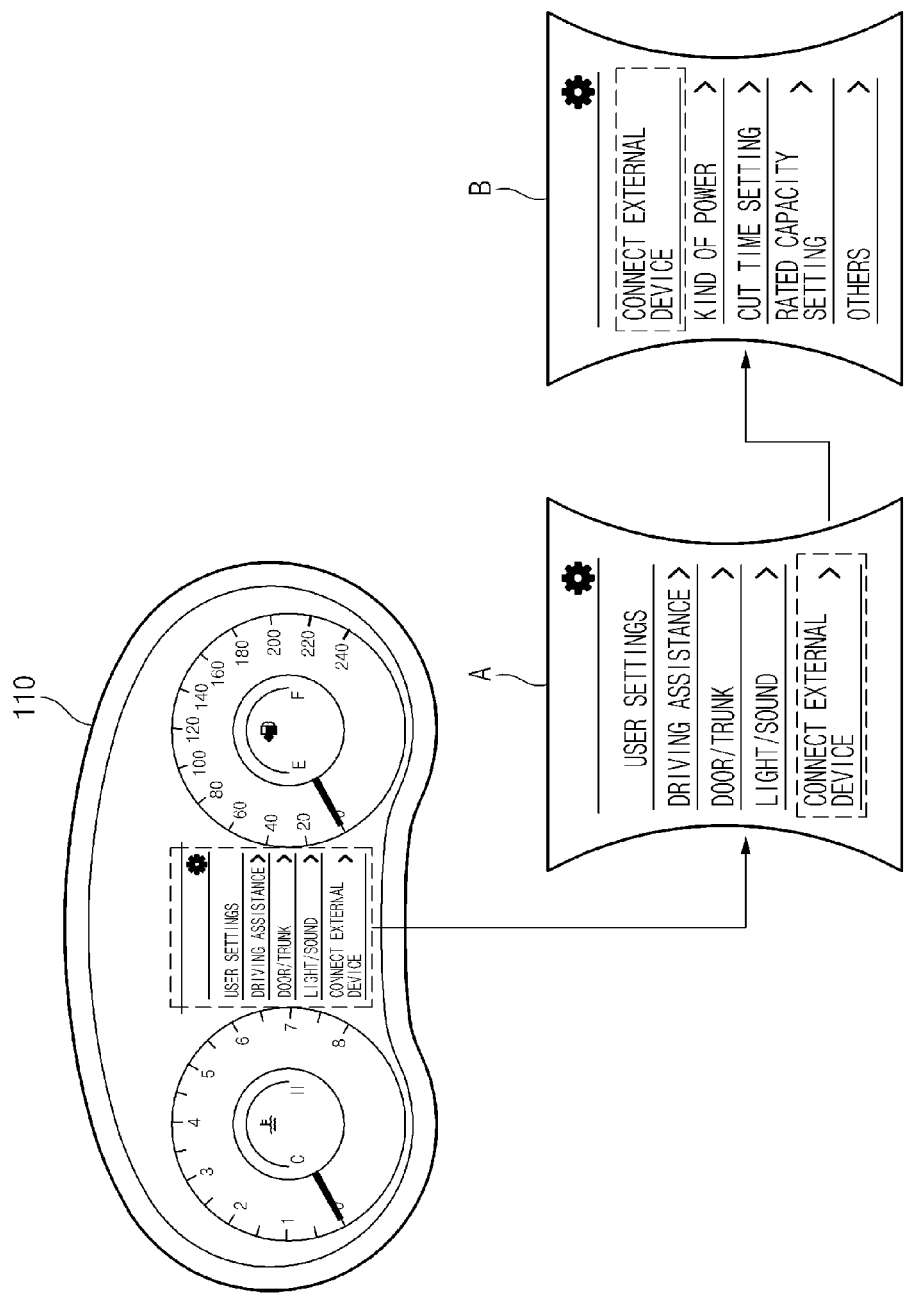
FIG. 3 is a diagram illustrating an electronic instrument cluster in the system for connecting the external device with the vehicle according to embodiments of the present disclosure.

FIG. 3 is a diagram illustrating an electronic instrument cluster in the system for connecting the external device with the vehicle according to embodiments of the present disclosure.

As shown in FIG. 3, the electronic instrument cluster 110 pops-up a user setting mode A so that the user may select the condition of power. The user setting mode A includes modes including a driving assistance mode, a door/trunk mode, a light/sound mode, an external device connection mode, and the like.

The external device connection mode B among the user setting mode A includes a type of power, a cut time setting, a rated capacity setting, and others. The type of power includes battery power (i.e., regular power), ACC power, or ignition power, the cut time setting may be set in the case in which the kind of power selected by the user is the battery power, and the rated capacity setting is a value which is set when the controller calculates the average value of the current sensed by the IPS element and determines whether or not an amount of current flowing in the external device connection terminal is an overcurrent.

The user may select the battery power (i.e., regular power) when the user wants to use constant power or continuously use power even during a parking of the vehicle, and may select the ACC power or the ignition power when the user wants to prevent the discharge of the battery.

Figure 4:
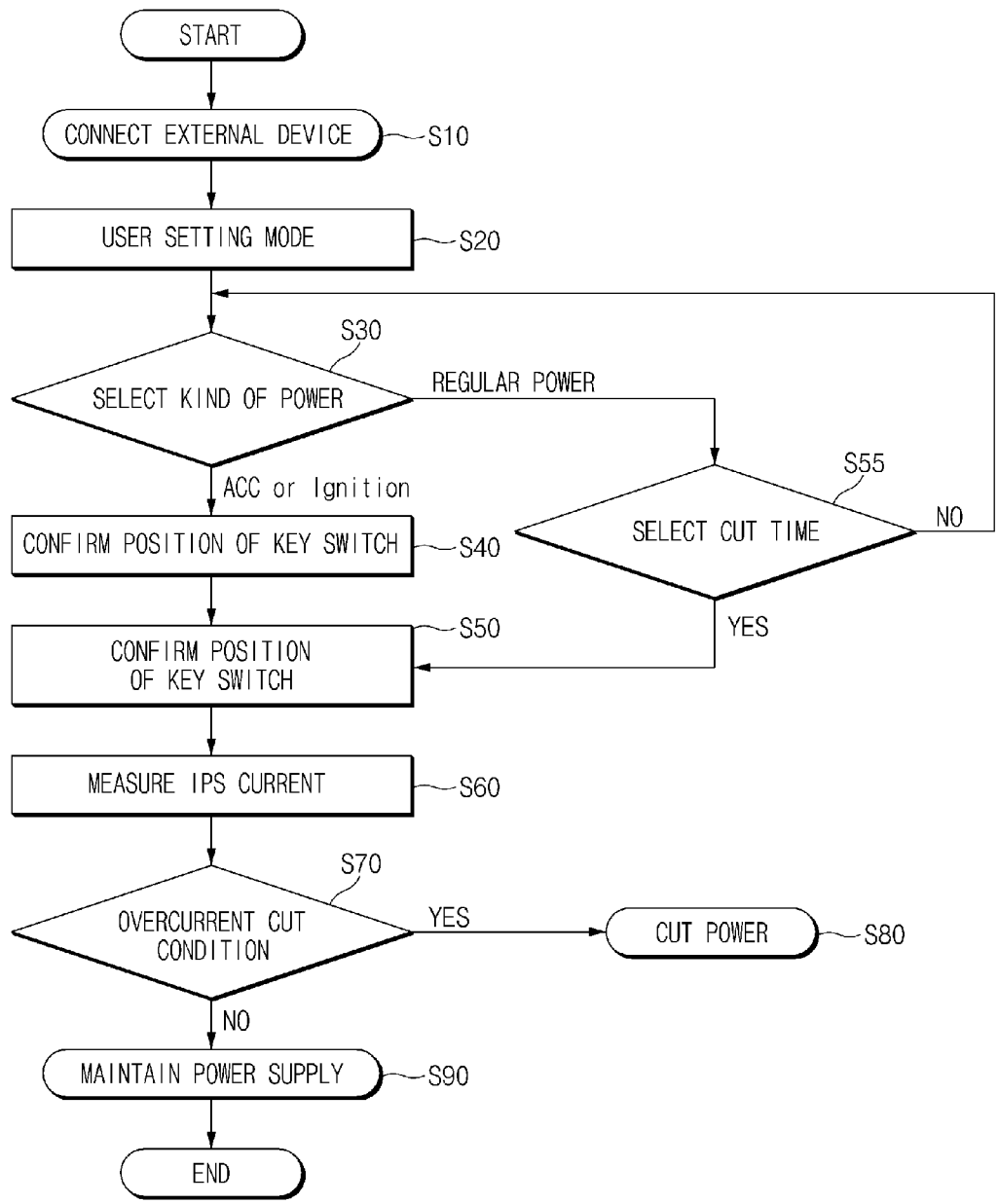
FIG. 4 is a diagram illustrating an operation method of a system for connecting an external device with a vehicle according to embodiments of the present disclosure.

FIG. 4 is a diagram illustrating an operation method of a system for connecting an external device with a vehicle according to embodiments of the present disclosure.

As shown in FIG. 4, if the external device is connected to the external device connection terminal of the vehicle, the electronic instrument cluster executes the user setting mode (S10 and S20).

Next, the user selects the kind of power from the user setting mode of the electronic instrument cluster (S30). The electronic instrument cluster then transmits a condition related to the selected kind of power to the controller.

Next, the controller confirms a position of the key switch (S40), and turns on the switching element when the kind of power selected by the user is the ACC power or the ignition power (S50).

However, when the kind of power selected by the user is the battery power (regular power), the cut time is selected (S55). When the switching element is turned on, the battery provides power to the external device connection terminal through the IPS element.

Next, after the IPS element measures a current of the external device connection terminal to which the IPS element is connected, the IPS element transmits the measured current to the controller (S60).

Next, the controller receives the current sensed by the IPS element and automatically calculates the average value of the sensed current to determine whether or not the amount of current flowing in the external device connection terminal is the overcurrent (S70).

When the controller determines whether or not the amount of current flowing in the external device connection terminal is the overcurrent, if the amount of current corresponds to the overcurrent cut condition, the controller cuts a current supply to the external device connection terminal, and if the amount of current does not correspond to the overcurrent cut condition, the controller maintains the current supply to the external device connection terminal (S80 and S90).

Figure 5:
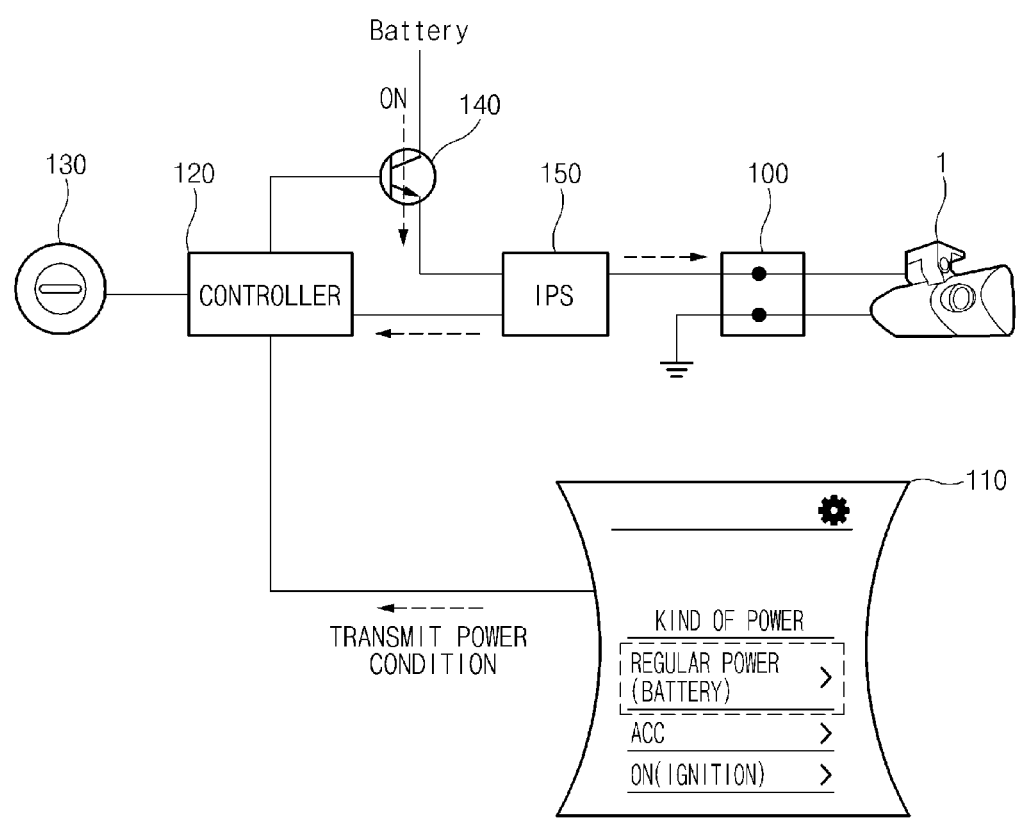
FIG. 5 is a diagram illustrating a case in which regular power is supplied from the system for connecting the external device with the vehicle according to embodiments of the present disclosure.

FIG. 5 is a diagram illustrating a case in which regular power is supplied from the system for connecting the external device with the vehicle according to embodiments of the present disclosure.

As shown in FIG. 5, when a black box 1 (external device) is connected to the external device connection terminal 100, the user setting mode of the electronic instrument cluster 110 is popped-up.

Next, when the user selects the kind of power as the regular power (i.e., battery power), the controller 120 turns on the switching element 140, regardless of the position of the key switch 130.

Next, when the switching element 140 is turned on, power is supplied to the external device connection terminal 100 through the IPS element 150, and when the power is supplied to the external device connection terminal 100, the IPS element 150 senses an amount of current flowing in the black box 1 and transmits the sensed amount of current to the controller 120.

Next, the controller 120 calculates the overcurrent cut condition. If it is determined that the amount of current flowing in the black box 1 is the overcurrent, the controller 120 turns off the switching element 140 to protect the circuit in the system of the vehicle and the black box 1.

Figure 6:
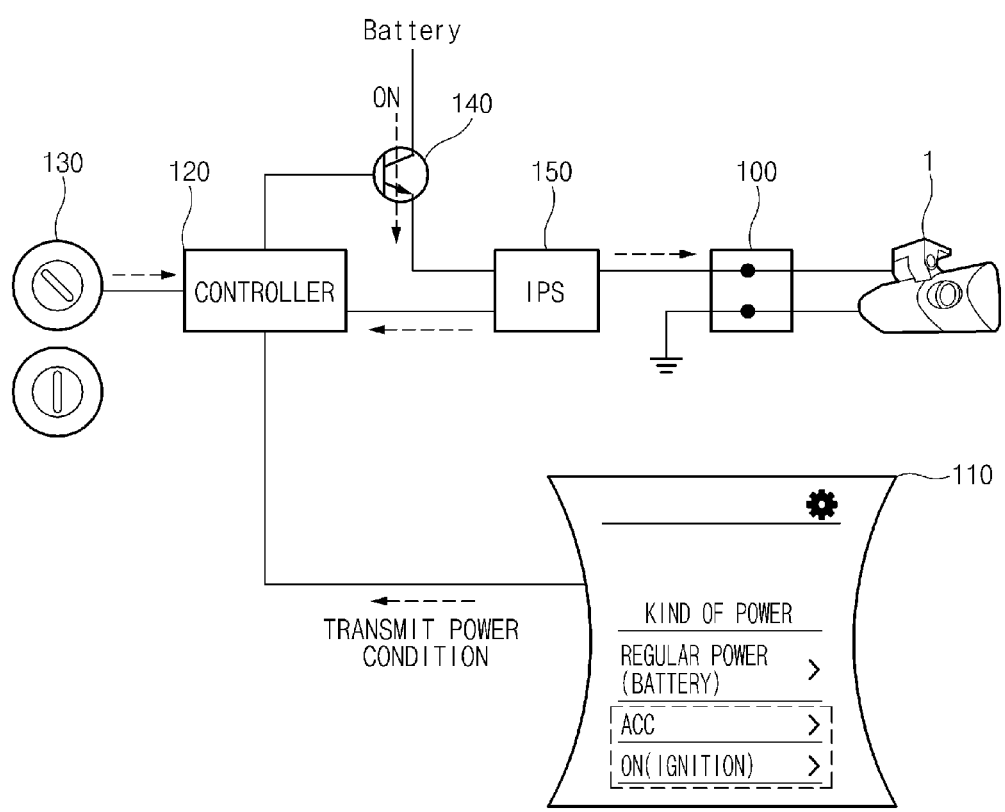
FIG. 6 is a diagram illustrating a case in which ACC power or ignition power is supplied from the system for connecting the external device with the vehicle according to embodiments of the present disclosure.

FIG. 6 is a diagram illustrating a case in which ACC power or ignition power is supplied from the system for connecting the external device with the vehicle according to embodiments of the present disclosure.

As shown in FIG. 6, when the black box 1 is connected to the external device connection terminal 100, the user setting mode of the electronic instrument cluster 110 is popped-up.

When the user selects the kind of power as the ACC power or the ignition power, the controller 120 then determines the position of the key switch 130 and then turns on the switching element 140 when the key switch 130 is positioned at a user selection position (i.e., the ACC power or the ignition power).

Next, when the switching element 140 is turned on, power is supplied to the external device connection terminal 100 through the IPS element 150, and when the power is supplied to the external device connection terminal 100, the IPS element 150 senses an amount of current flowing in the black box 1 and transmits the sensed amount of current to the controller 120.

The controller 120 then calculates the overcurrent cut condition. If it is determined that the amount of current flowing in the black box 1 is the overcurrent, the controller 120 turns off the switching element 140 to protect the circuit in the system of the vehicle and the black box 1.

As described above, the techniques disclosed herein are capable of performing an automatic power cut, when an abnormal current occurs by an overcurrent, short, or the like depending on a change in a consumed current of the external device at the time of connecting the external device with the vehicle. Further, power is supplied through the external device connection terminal, such that a quality problem which may be caused by an arbitrary use a wire of a fuse box by the user may be prevented in advance, and a menu from which the user may easily select a kind of power may be provided to prevent the discharge of the battery, or the like.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for connecting an external device to a vehicle, the system comprising:

an external device connection terminal configured to be connected to an external device;

an electronic instrument cluster configured to display a user setting mode when the external device connection terminal is connected to the external device;

a controller configured to receive an indication of a power source selected by a user from the electronic instrument cluster and control a switching element configured to adjust whether or not power is applied from a battery of the vehicle based on the power source selected by the user; and an intelligent power switch (IPS) element configured to sense a current supplied to the external device connection terminal and provide the sensed current to the controller, wherein the controller is further configured to calculate an average value of the current sensed by the IPS element and turn off the switching element when an amount of current flowing is greater than or equal to the average value of the current sensed by the IPS element after a predetermined period of time.

2. The system according to claim 1, wherein:

the user setting mode includes an external device connection menu, the external device connection menu includes a menu with user-selectable options including the power source and a cut time setting.

3. The system according to claim 2, wherein the power source provides one of battery power, ACC power, and ignition power.

4. The system according to claim 1, further comprising a key switch configured to adjust the power source selected by the user.

* * * * *